(12) United States Patent
Schaeuble

(10) Patent No.: US 9,211,869 B2
(45) Date of Patent: Dec. 15, 2015

(54) WIPER BLADE FOR CLEANING VEHICLE WINDOWS

(71) Applicant: Valeo Systèmes d'Essuyage, Le Mesnil Saint Denis (FR)

(72) Inventor: Michael Schaeuble, Vaihingen/Enz (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 218 days.

(21) Appl. No.: 13/954,061

(22) Filed: Jul. 30, 2013

(65) Prior Publication Data

US 2014/0026348 A1    Jan. 30, 2014

(30) Foreign Application Priority Data

Jul. 30, 2012    (DE) .................... 10 2012 106 947

(51) Int. Cl.
| | |
|---|---|
| *B60S 1/40* | (2006.01) |
| *B60S 1/38* | (2006.01) |
| *B60S 1/46* | (2006.01) |
| *B60S 1/52* | (2006.01) |

(52) U.S. Cl.
CPC ............ *B60S 1/4003* (2013.01); *B60S 1/3805* (2013.01); *B60S 1/3862* (2013.01); *B60S 1/3868* (2013.01); *B60S 1/524* (2013.01); *B60S 1/40* (2013.01); *B60S 1/4045* (2013.01); *B60S 2001/4054* (2013.01)

(58) Field of Classification Search
CPC .... B60S 1/4038; B60S 1/4045; B60S 1/4048; B60S 1/4064; B60S 1/3849; B60S 1/3862; B60S 1/3868; B60S 1/3805; B60S 1/40; B60S 1/46; B60S 1/524
USPC .............................. 15/250.32, 250.46, 250.04
See application file for complete search history.

(56) References Cited

U.S. PATENT DOCUMENTS

2002/0133895 A1*    9/2002    Herinckx et al. .......... 15/250.46

FOREIGN PATENT DOCUMENTS

DE        10 2010 025 687 A1    1/2012
EP              2460700 B1 *    7/2013

* cited by examiner

*Primary Examiner* — Gary Graham
(74) *Attorney, Agent, or Firm* — Osha Liang LLP

(57) ABSTRACT

The invention relates to a wiper blade (10) for cleaning vehicle windows, with a wiper blade body (11) connected to a wiper blade adapter (13), wherein the wiper blade adapter (13) consists of an adapter element (18) on the wiper arm side and an adapter element (17) on the wiper blade side, which are arranged pivotably with respect to one another in an axis (19), and with a distributor element (30; 30*a*) arranged pivotably in the axis (19) for a washing fluid connection and/or an electrical connection for the wiper blade body (11), wherein the distributor element (30; 30*a*) is received between two side walls (24, 25) of the adapter element (17) on the wiper blade side, wherein an aperture (26, 27), round in cross-section, is formed respectively on the two side walls (24, 25) of the adapter element (17) on the wiper blade side, aligned to the axis (19), and wherein the distributor element (30; 30*a*) on the side facing the side wall (24, 25) respectively has a conical bearing extension (37; 37*a*, 38; 38*a*), which engages into the aperture (26, 27).

8 Claims, 2 Drawing Sheets

WIPER BLADE FOR CLEANING VEHICLE WINDOWS

PRIOR ART

Figure 1:
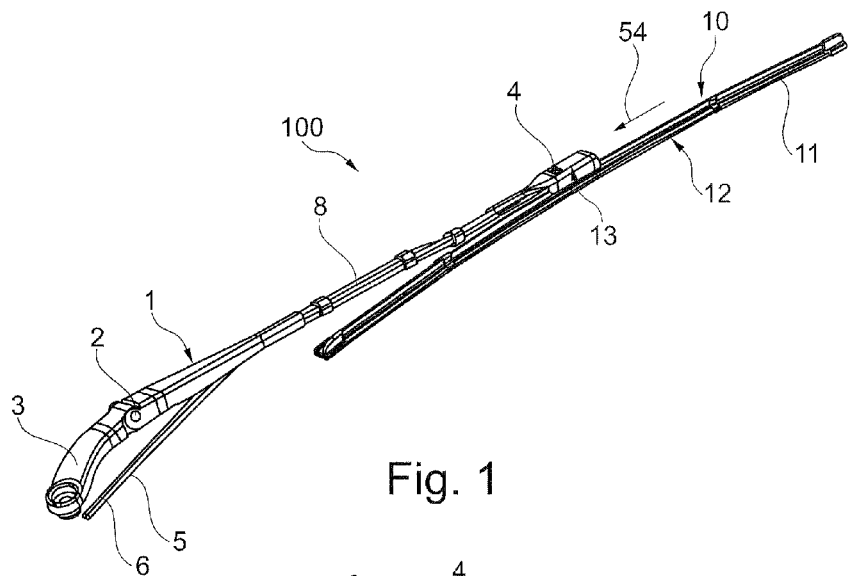

The invention relates to a wiper blade for cleaning vehicle windows.

A wiper blade of this type is known from DE 10 2010 025 687 A1 by the applicant. The known wiper blade is fastened exchangeably to a wiper arm by means of a wiper blade adapter. The wiper blade adapter comprises an adapter element on the wiper arm side and an adapter element on the wiper blade side, which adapter elements are arranged pivotably with respect to one another in an axis. Moreover, the known wiper blade is configured as a heatable wiper blade and also has washing fluid ducts for guiding a washing fluid in the wiper blade body. The hydraulic supply of the wiper blade with washing fluid and of the heating device with electrical energy takes place via a distributor element which is arranged in the wiper blade adapter. The distributor element is coupled to electrical lines and to fluid hoses which are guided in the wiper arm. In the known wiper blade, the distributor element is formed from two part elements which are connected to one another, one part element serving for the hydraulic supply of the wiper blade, and the other part element serving for the electrical supply of the heating device. It is essential that the distributor element is always situated in one and the same position with respect to the wiper arm or with respect to the adapter element on the wiper arm side, in order that no forces are exerted on the inlet side on the hose lines arranged in the wiper arm and on the electrical line. To this end, the distributor element has outwardly protruding bearing extensions which are arranged on side walls of the distributor element and serve to mount the distributor element in the axis and in apertures of side walls of the adapter element on the wiper blade side. Furthermore, the distributor element is coupled to the adapter element on the wiper arm side via a positively locking connection on the upper side of the distributor element, with the result that, in the case of a pivoting movement of the adapter element on the wiper blade side, the distributor element remains in the desired stationary position in the adapter element on the wiper arm side and therefore also with respect to the wiper arm by way of the bearing contact. It is therefore required to configure the distributor element on its upper side, for example, by way of elevations or the like in such a way that a coupling of the distributor element to the adapter element on the wiper arm side is produced by way of a bearing contact.

DISCLOSURE OF THE INVENTION

Proceeding from the prior art which is shown, the invention is based on the object of developing a wiper blade for cleaning vehicle windows in such a way that, in the region of its upper side or in the direction towards the adapter element on the wiper arm side, the distributor element does not require any elements which produce a positively locking connection between the distributor element and the adapter element on the wiper arm side by way of a bearing contact. As a result, in particular, the structural freedom with regard to the configuration of the distributor element in the region below the adapter element on the wiper arm side is increased and an increased amount of installation space is available which can be utilized in some other way.

According to the invention, this object is achieved in a wiper blade for cleaning vehicle windows by virtue of the fact that the bearing extension projects over the respective side wall of the adapter element on the wiper blade side, on the side facing away from the at least one distributor element, that the bearing extension engages into a recess of the adapter element on the wiper arm side, and that between the bearing extension and the recess of the adapter element on the wiper arm side a form-fitting geometry is formed which is fixed with respect to the rotational angle. In other words, this means that the coupling of the distributor element to the adapter element on the wiper arm side takes place via a special form-fitting geometry in the region of the bearing extensions of the distributor element, which coupling is configured in such a way that a geometry is formed which is fixed with respect to the rotational angle, that is to say avoids a mutual (rotational) movement of the distributor element and of the adapter element on the wiper arm side.

All combinations of at least two features which are disclosed in the claims, the description and/or the figures fall within the scope of the invention.

In order to achieve a rotational movement of the distributor element with respect to the adapter element on the wiper blade side, it is required that the aperture in the adapter element on the wiper blade side has a round shape at least in regions. In a first refinement of the invention, the form-fitting geometry between the distributor element and the adapter element on the wiper arm side is formed by the fact that the bearing extension has a cross section which is round in parts, with at least one flat portion. Here, the region with the round cross section (the diameter of which is adapted to the diameter of the aperture in the adapter element on the wiper blade side) serves for the possibility of the pivoting of the distributor element with respect to the adapter element on the wiper blade side, whereas the flat portion interacts with a correspondingly shaped aperture in the adapter element on the wiper arm side, in such a way that the arrangement, which is fixed with respect to the rotational angle, of the distributor element with respect to the adapter element on the wiper arm side is achieved via a bearing contact of the flat portion.

In one particularly preferred refinement of the bearing extension, it is provided that two flat portions are provided, which are arranged offset by 180° to one another. As a result, the surface pressure and the moments to be transmitted in the region of the bearing extensions are reduced, with the result that, in particular, particularly low wear and particularly low mechanical loading take place.

In order to achieve mounting which is as simple as possible of the distributor element with its bearing extensions which penetrate the apertures in the side walls of the adapter element on the wiper blade side, it is provided in one preferred refinement of the invention that the lateral arms of the distributor element are constructed so as to be elastically deformable in the region of the bearing extensions, and that the bearing extensions are arranged on a side of the lateral arms facing away from a connecting arm. It is meant here that the two bearing extensions can be pressed (from outside) against one another in such a way that their mutual spacing makes it possible to introduce the distributor element between the side walls of the adapter element on the wiper blade side.

Figure 2:
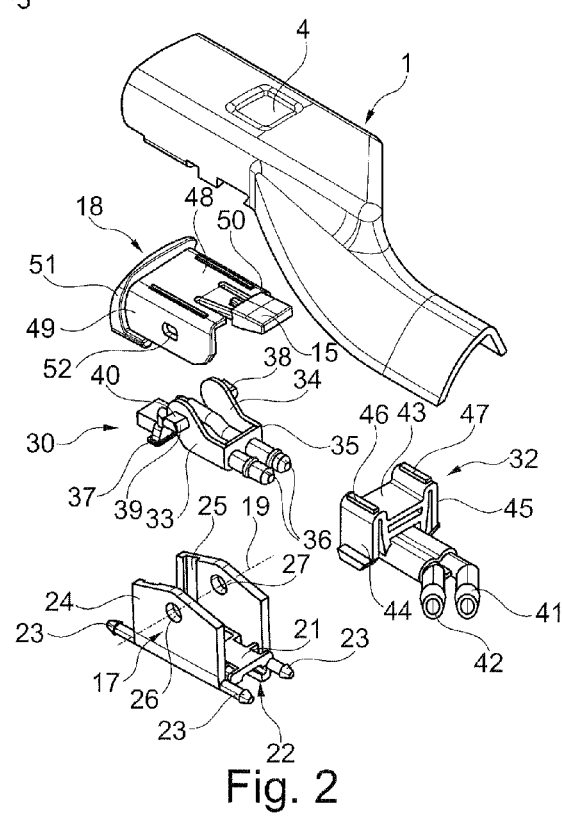
Figure 3:
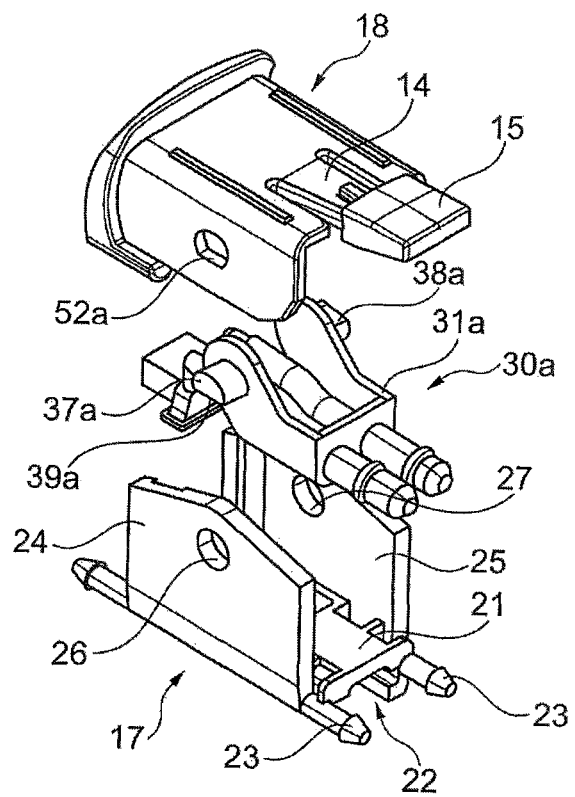
Figure 4:
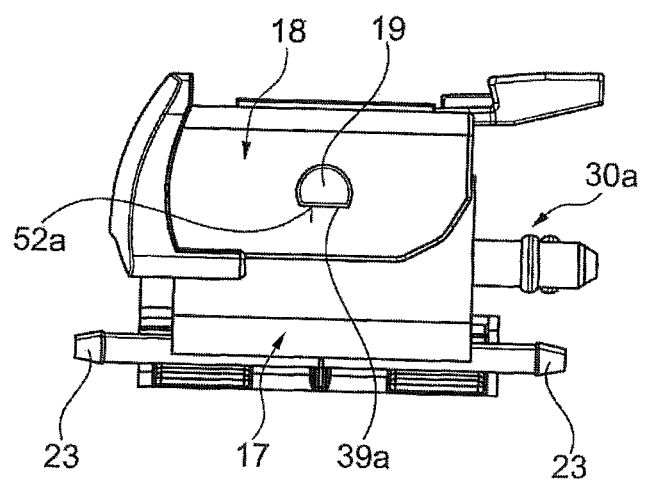

Further advantages, features and details of the invention result from the following description of preferred exemplary embodiments and using the drawing, in which:

FIG. 1 shows a wiper device using a wiper blade according to the invention, in a perspective view, FIG. 2 shows parts of a wiper blade adapter and of a wiper arm in an exploded illustration, FIG. 3 shows a wiper blade adapter which is modified in comparison with FIG. 2, likewise in an exploded illustration, and FIG. 4 shows a wiper blade adapter which is mounted using the parts of the wiper blade adapter according to FIG. 3, in a side view.

Identical elements and elements with an identical function are provided with the same reference numerals in the figures.

FIG. 1 shows a wiper device 100 for wiping a vehicle window (not shown). The wiper device 100 comprises a wiper arm 1, the wiper rod 8 of which is fastened pivotably to a bearing element 3 via a wiper arm hinge 2. The bearing element 3 is for its part connected to a shaft of a wiper drive (not shown).

On the side which faces away from the wiper arm hinge 3, a wiper blade 10 according to the invention is fastened exchangeably to the wiper rod 8 of the wiper arm 1. The wiper blade 10 has a wiper blade body 11 with a wiper lip 12 which bears against the vehicle window during operation of the wiper blade 10, it being possible for the wiper blade 10 to be connected to the wiper arm 1 by means of a wiper blade adapter 13 which is fastened to the wiper blade body 11. To this end, the wiper blade adapter 13 has an actuating button 15 which is suspended elastically on a spring tongue 14 (FIG. 3), engages in a positively locking manner into a cut-out 4, which is formed on the upper side of the wiper arm 1, in the form of an aperture and forms a latching connection in the operating state of the wiper blade 10, in which the latter is fastened to the wiper arm 1.

The wiper blade adapter 13 comprises an adapter element 17 on the wiper blade side and an adapter element 18 on the wiper arm side, which are arranged pivotably to one another in an axis 19. The adapter element 17 on the wiper blade side comprises a bottom region 21 with a receptacle 22 which runs in the longitudinal direction for receiving spring bars in a clamping manner, which spring bars are not shown in the figures, are usually pre-bent and are arranged in a positively locking manner in the longitudinal direction of the wiper blade body 11 in corresponding receptacles of a wiper rubber. Furthermore, washing fluid stubs 23 can also be seen in the bottom region 21, which washing fluid stubs 23 engage into washing fluid ducts which are arranged or formed on the wiper blade body 11. Via the washing fluid stubs 23, a washing fluid is fed to spray openings which are formed on the wiper blade body 11, as is already known from the prior art.

The adapter element 17 on the wiper blade side comprises two plate-shaped side walls 24, 25 which protrude from the bottom region 21 in the direction of the adapter element 18 on the wiper arm side. In each case one aperture in the form of a round hole 26, 27 is formed in each side wall 24, 25. The two holes 26, 27 likewise form the axis 19.

A distributor element 13 which serves to supply the wiper blade 10 with washing fluid is arranged between the side walls 24, 25 of the adapter element 17 on the wiper blade side. To this end, hose lines 5, 6 which can be seen in FIG. 1 are arranged in the wiper arm 1. The distributor element 30 is connected to a connecting element 32 which is arranged in the wiper arm 1. The connecting element 32 is in turn connected hydraulically to the hose lines 5, 6. The distributor element 30 has a U-shaped holder in plan view with two lateral arms 33, 34 which are connected to one another on a longitudinal side by means of a connecting arm 35. The connecting arm 35 also carries connector stubs 36 which can be connected to the connecting element 32. The two plate-shaped lateral arms 33, 34 in each case have a rectangular cross section, the lateral arms 33, 34 being arranged parallel to the two side walls 24, 25 of the adapter element 17 on the wiper blade side.

On the side which lies opposite the connecting arm 35, in each case one bearing extension 37, 38 is formed integrally on each lateral arm 33, 34 on the side which faces the side wall 24, 25 of the adapter element 17 on the wiper blade side. The bearing extension 37, 38 has a region with a round cross section, the diameter of which is adapted to the diameter of the holes 26, 27. On sides which lie opposite one another, that is to say offset by 180° with respect to one another, the two bearing extensions 37, 38 in each case have a flat portion 39, 40. The distributor element 30 is mounted pivotably in the holes 26, 27 of the adapter element 17 on the wiper blade side by means of the bearing extensions 37, 38, the two bearing extensions 37, 38 protruding beyond the two side walls 24, 25 of the adapter element 17 on the wiper blade side in the mounted state of the distributor element 30, that is to say protruding out of the holes 26, 27 by a certain amount.

The connecting element 32 which serves for the hydraulic connection of the hose lines 5, 6 to the distributor element 30 has two connector stubs 41, 42 for connection to the hose lines 5, 6 which are formed on a main body 43. The main body 43 has two positioning sections 44, 45 which are arranged parallel to one another, are approximately U-shaped in cross section in each case and are arranged within the cross section of the wiper arm 1 laterally next to the cut-out 4. Web-shaped bearing ribs 46, 47 which, in the mounted state of the connecting element 32, bear against that inner side of the wiper arm 1 which faces it are formed on the upper sides of the positioning sections 44, 45.

The adapter element 18 on the wiper arm side has an approximately plate-shaped upper side 48, on which the spring tongue 14 and the actuating button 15 are also formed. Two lateral bounding walls 49, 50 emanate from the upper side 48, with the result that the cross section of the adapter element 18 on the wiper arm side is of approximately U-shaped configuration in the region of the bounding walls 49, 50. Furthermore, on the side which faces away from the wiper arm 1, the adapter element 18 on the wiper arm side also has a front terminating wall 51 of curved configuration. It is essential that recesses or apertures 52 are formed in the bounding walls 49, 50, the cross-sectional shape of which recesses or apertures 52 is adapted to the cross-sectional shape of those sections of the bearing extensions 37, 38 which protrude out of the side walls 24, 25 of the adapter element 17 on the wiper blade side. In particular, when the adapter element 18 on the wiper arm side is mounted, the bearing extensions 37, 38 engage into the apertures 52 in such a way that a positively locking connection is formed which fixes the distributor element 30 in its rotational-angle position with respect to the adapter element 18 on the wiper arm side.

In order to mount the wiper blade adapter 13, first of all the distributor element 30 is introduced between the side walls 24, 25 of the adapter element 17 on the wiper blade side by the lateral arms 33, 34 being pressed together, in such a way that the two bearing extensions 37, 38 are arranged in the holes 26, 27. The adapter element 18 on the wiper arm side is then connected to the adapter element 17 on the wiper blade side by virtue of the fact that the bounding walls 49, 50 are introduced with their apertures 52 into the bearing extensions 37, 38. As a result, firstly the rotatable or pivotable mounting of the adapter element 18 on the wiper arm side with respect to the adapter element 17 on the wiper blade side is ensured via the bearing extensions 37, 38 of the distributor element 30, and secondly the (rigid) coupling of the distributor element 30 to the adapter element 18 on the wiper arm side is ensured.

The connection of the wiper blade 10 or the wiper blade adapter 11 to the wiper arm 1 takes place in a known way by insertion of the wiper blade 10 or the wiper blade adapter 11 into the cross section of the wiper arm 1 in the direction of the arrow 54 (FIG. 1) until the actuating button 15 latches into the cut-out 4 on the upper side of the wiper arm 1 and therefore fixes the wiper blade 10 with respect to the wiper arm 1. Here, the connector stubs 36 of the distributor element 30 come into an operative connection with the connecting element 32.

FIGS. 3 and 4 show a modified exemplary embodiment of the invention. This exemplary embodiment is distinguished by the fact that the cross section of the bearing extensions 37*a*, 38*a* of the distributor element 30*a* has merely a single flat portion 39*a* which is formed or arranged on that side of the adapter element 17 on the wiper blade side which faces the bottom region 21. Otherwise, the cross section of the bearing extensions 37*a*, 38*a* is circular. Accordingly, the apertures 52*a* (merely one aperture 52*a* being visible in FIG. 3) also have a cross section with merely a single flat portion.

The above-described wiper blade 10 can be amended or modified in a wide variety of ways, without deviating from the concept of the invention. It is thus conceivable, for example, that the distributor element 30, 30*a* serves additionally or exclusively for the power supply of a heating device which is arranged in the wiper blade 10.

LIST OF REFERENCE NUMERALS

1 Wiper arm
2 Wiper arm hinge
3 Bearing element
4 Cut-out
5 Hose line
6 Hose line
8 Wiper rod
10 Wiper blade
11 Wiper blade body
12 Wiper lip
13 Wiper blade adapter
14 Spring tongue
15 Actuating button
17 Adapter element on the wiper blade side
18 Adapter element on the wiper arm side
19 Axis
21 Bottom region
22 Receptacle
23 Washing fluid stub
24 Side wall
25 Side wall
26 Hole
27 Hole
30, 30*a* Distributor element
32 Connecting element
33 Lateral arm
34 Lateral arm
35 Connecting arm
36 Connector stub
37, 37*a* Bearing extension
38, 38*a* Bearing extension
39, 39*a* Flat portion
40 Flat portion
41 Connector stub
42 Connector stub
43 Main body
44 Positioning section
45 Positioning section
46 Bearing rib
47 Bearing rib
48 Upper side
49 Bounding wall
50 Bounding wall
51 Connecting wall
52, 52*a* Aperture
54 Arrow
100 Wiper device

The invention claimed is:

1. A wiper blade for cleaning vehicle windows, comprising:
    a wiper blade body connected with a wiper blade adapter,
    wherein the wiper blade adapter includes an adapter element on a wiper arm side and an adapter element on a wiper blade side, which are arranged pivotably with respect to one another about an axis; and
    a distributor element arranged pivotably about the axis for a washing fluid connection and/or an electrical connection for the wiper blade body,
    wherein the distributor element is received between two side walls of the adapter element on the wiper blade side,
    wherein an aperture is formed respectively on each of the two side walls of the adapter element on the wiper blade side, aligned to the axis,
    wherein the distributor element includes bearing extensions formed on each side of the distributor element that faces one of the two walls of the adapter element on the wiper blade side such that each bearing element engages the respective aperture,
    wherein each bearing extension projects past the respective side wall of the adapter element on the wiper blade side,
    wherein each bearing extension engages into a recess of the adapter element on the wiper arm side, and
    wherein between the bearing extensions and the recesses of the adapter element on the wiper arm side a form-fitting geometry is formed such that the distributor element is fixed rotationally with respect to the adapter element on the wiper arm side.

2. The wiper blade according to claim 1, wherein the bearing extensions have a cross-section which is round in parts, with at least one flat portion.

3. The wiper blade according to claim 2, wherein two flat portions are provided, which are arranged offset by 180° to one another.

4. The wiper blade according to claim 1, wherein a lateral arms of the distributor element are constructed so as to be elastically deformable in a region of the bearing extensions, and wherein the bearing extensions are arranged on a side of the lateral arms facing away from a connecting arm.

5. The wiper blade according to claim 1, wherein the distributor element is connected with a connecting element which is arranged in the wiper arm.

6. The wiper blade according to claim 5, wherein the connecting element has two fork-shaped positioning sections, between which an opening for an actuating button is arranged in the wiper arm.

7. The wiper blade according to claim 6, wherein in the region of the fork-shaped positioning sections on the side facing the adapter element on the wiper arm side, the connecting element has respectively an abutment section for abutment against the inner side of the wiper arm.

8. The wiper blade according to claim 1, wherein the bearing extensions terminate approximately flush with the outer sides of the side walls.

* * * * *